United States Patent
Rack

[11] 3,834,072
[45] Sept. 10, 1974

[54] SHAPE-RETAINING SUBSTRATE FOR A PLANT AND METHOD OF MAKING THE SAME

[76] Inventor: David Rack, Schwarzgrabenweg 17, A-5020 Salzburg, Austria

[22] Filed: Sept. 17, 1973

[21] Appl. No.: 398,067

Related U.S. Application Data

[63] Continuation-in-part of Ser. No. 41,355, May 28, 1970, abandoned.

[30] Foreign Application Priority Data

| | | |
|---|---|---|
| June 6, 1969 | Austria | 5353/69 |
| Nov. 20, 1969 | Austria | 10854/69 |
| Nov. 20, 1969 | Austria | 10855/69 |
| Mar. 5, 1970 | Austria | 2085/70 |

[52] U.S. Cl. .................................. 47/37, 47/56
[51] Int. Cl. .................................. A01g 9/10
[58] Field of Search .................................. 71/1, 64

[56] References Cited
UNITED STATES PATENTS

| | | |
|---|---|---|
| 1,446,113 | 2/1923 | Blackwell ........................ 47/34 |
| 2,965,584 | 12/1960 | Elkin ........................... 47/DIG. 7 |
| 2,971,292 | 2/1961 | Malecki ....................... 47/DIG. 7 |
| 2,988,441 | 6/1961 | Pruitt .......................... 47/DIG. 7 |
| 3,080,681 | 3/1963 | Merrill et al. ..................... 47/56 |
| 3,472,644 | 10/1969 | Woodside et al. .................... 71/1 |

FOREIGN PATENTS OR APPLICATIONS

| | | |
|---|---|---|
| 722,589 | 11/1965 | Canada |
| 1,949,462 | 4/1971 | Germany |
| 1,949,473 | 4/1971 | Germany |
| 2,013,352 | 10/1971 | Germany |

*Primary Examiner*—Robert E. Bagwill
*Attorney, Agent, or Firm*—Kurt Kelman

[57] ABSTRACT

A shape-retaining substrate for a plant comprises a mixture of 30 to 60 parts of dried peatmoss, 50 to 20 parts of foam flakes, a plant nutrient, and 15 to 20 parts of a polyurethane binder free of foaming agent which bonds the peatmoss, the foam flakes and the nutrient. The substrate is made by reacting the polyurethane constituents in situ with the peatmoss, foam flakes and nutrient mixture.

7 Claims, 5 Drawing Figures

PATENTED SEP 10 1974     3,834,072

INVENTOR.
DAVID RACK
BY
AGENT

SHAPE-RETAINING SUBSTRATE FOR A PLANT AND METHOD OF MAKING THE SAME

This is a continuation-in-part of my copending patent application Ser. No. 41,355, filed May 28, 1970, now abandoned.

The present invention relates to an improved and shape-retaining substrate for a plant, such as a seed or seedling, and a method of making the same.

Plants, including seeds, seedlings and sod, have been sold in substrates comprising a clump of a particulate material capable of sustaining the life of the plant, such as a mixture of earth, peatmoss, fertilizer and/or other nutrients, and flakes of a synthetic, liquid-absorptive resin as a soil conditioner, if desired. When such planted seeds or seedlings are stored for sale and then transported, it is necessary to place them into containers to hold the particulate material in the substrate together. When the seeds or seedlings are ready to be positioned in the soil of their ultimate growing location, the substrate must be removed from the container, which often causes damage to the tender plant in the substrate, sufficient to cause delays in growth and sometimes even causing the death of the plant. Furthermore, containers are expensive and inconvenient to use.

While attempts have been made to dispense with containers by pressing together particulate materials capable of sustaining the life of a plant in admixture with other materials adapted to impart further solidity to the compressed ball or clump, none has been successful in providing a substrate supporting the growth of a seed or seedling which will hold together under normal conditions of transport. Therefore, even compressed substrates have had to be transported in containers, such as boxes, pots or the like.

It is the primary object of the present invention to overcome these disadvantages and to provide a substrate capable of sustaining the life of a plant, including a seed or seedling, wherein a seed or seedling may be kept and cultivated until fully grown, if desired. In the substrate of the invention, the plant may not only be grown but it may also be transported safely therein, without danger of partial or full disintegration due to shocks incurred during transportation, and the plant with its substrate may then be placed into the ground where it is to be planted.

These and other objects are accomplished in accordance with this invention with a shape-retaining substrate for at least one plant, which comprises a mixture of 30 to 60 parts, preferably about 45 parts, or particles of peatmoss having a water content reduced to about 15% to less than 20%, by weight, 50 to 20 parts, preferably about 45 to 40 parts, of synthetic resin foam flakes, a particulate plant nutrient, and 15 to 20 parts of a polyurethane binder free of foaming agent mixed with the peatmoss, the foam flakes and the nutrient and bonding the same, all parts being by weight. The foam flakes preferably have a diameter of about 5 to 15 mm.

The peatmoss is dried to a water content of less than 20%, by weight, since the free water in the peatmoss otherwise tends to foam the polyurethane binder, which is to be avoided to the largest possible extent according to this invention to improve its bonding property. The less free water content in the peatmoss, the better the bonding of the substrate particles to each other. However, when the water content of the peatmoss is reduced to less than 15%, the surface tension increases to such a marked degree that water can no longer be absorbed by the peatmoss, and this important effect of the peatmoss in the substrate is, therefore, lost. If the peatmoss were dried to a water content of 6%, by weight, it can no longer adsorb any water at all.

In making the substrate by mixing liquid reactants forming a polyurethane binder in situ and in the absence of a foaming agent with the peatmoss, the foam flakes and the nutrient, it is useful to add a surface active or wetting agent to the mixture to reduce the surface tension of the peatmoss. About 0.7 to 1 part, by weight, of the wetting agent is added, preferably to the hydroxyl reactant before it is mixed with the isocyanate reactant of the polyurethane binder.

Throughout the specification and claims, "plant" designates flora at any stage of growth, i.e. from seed, seedling to full-sized plant.

Any useful plant growth promoting nutrient may be used, including fertilizers and trace elements used in growing plants. The synthetic resin foam flakes operate as growth conditioners serving to make the mixture of the substrate looser and to absorb and store liquids. Polyether and polyester foams may be used for this purpose, for instance.

Polyurethanes and the reactant components forming them are staple products of commerce, and they may be obtained readily on the open market, together with directions of how to mix the components to produce them. Therefore and since the present invention is not concerned with the known production of polyurethanes but merely with the use of these known compounds and their method of manufacture as bonding agents in forming balls for seedlings and plants, no detailed description of the compounds or the manner of manufacture is believed to be required. By way of example, "Polyurethanes" by Bernard A. Dombrow, Reinhold Publishing Corporation, New York, 1957, is incorporated herein as part of the disclosure of making polyurethanes.

Basically, polyurethanes are polymers produced by the addition reaction between polyisocyanates (preferably difunctional but higher, if desired) and hydroxyl-rich compounds, such as polyols, polyesters, polyethers, etc. Tolylene diisocyanate may be one of the most readily available isocyanate components in the manufacture of polyurethanes, and a polyester of adipic acid and a triol, such as glycerine, is a readily available hydroxyl-rich component in the manufacture thereof. If desired, an activator solution containing water, a catalyst, emulsifier, cell modifiers, etc., also readily available as a staple commercial product, may be incorporated with the two components forming the polyurethane in situ. In making the same, streams of these liquid components may simply be poured into a container where they will react to form a polyurethane of the desired rigidity or flexibility, depending on the nature of the selected components, as is explained, for instance, in the above-mentioned work by Dombrow.

The above and other objects, advantages and features of the present invention will become more apparent from the following detailed description of certain now preferred embodiments, taken in conjunction with the accompanying drawing wherein FIG. 1 is a perspective view of a substrate holding a seedling;

Figure 2:
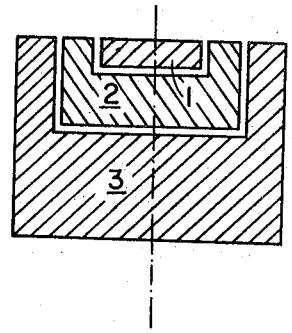
FIGS. 2 and 3 are perspective views of like substrates of increasingly increasing volume for association with the substrate of FIG. 1 and with each other.

The nutrients may include bone meal, dried blood, dried natural fertilizers as organic compounds, and such mineral components as potassium, phosphorus, nitrogen and trace elements. Plant growing mixtures of various kinds are well within the skill of the horticulturist, and the present invention is not concerned with this aspect of the substrate, apart from its combination with a polyurethane bonding agent in the substrate.

As previously indicated, the polyurethane is formed in situ in admixture with the particulate material of the substrate in conventional manner, the two liquid reactants forming the polyurethane within a few minutes after being thoroughly mixed with the particulate material. One of the liquid reactants is a polyol, a polyester or a polyether, such as commonly used in the manufacture of polyurethane, to which is admixed an activator solution of similarly known composition to accelerate the reaction, no foaming agent being used. The other liquid reactant is a diisocyanate of similarly known type used commercially in the making of polyurethane. The foaming agent is omitted from the activator solution because foaming is not desired and the polyurethane is used solely as a bonding agent for the particles of the substrate.

In commercial practice, the organic and inorganic components of a desired particulate material capable of sustaining the life of a selected plant are mixed in a drum, the liquid reactants capable of forming a polyurethane are mixed in a container, and the reactant mixture is sprayed into the drum through nozzles before the reaction has occurred. The liquid reactant mixture is then thoroughly mixed with the particulate material in the drum, reacting in situ to form a polyurethane bonding agent for the particles. The bonded particulate material is then removed from the drum, for instance by a piston or by a screw conveyor. Afterwards, it is shaped by molding, cutting or any other desired procedure into cylinders, plates or other desired forms to produce substrates which will retain their shapes after the polyurethane bonding agent has hardened. Seeds or seedlings may then be readily planted in the shape-retaining substrates.

If desired, seeds may be placed on the surface of the substrate and a retaining layer may be arranged thereover, such a retaining layer being, if desired, a layer of wax or a suitable synthetic resin or cellulosic film, such as have been commercially used in planting "carpets."

Substrates of this type may be used to hold the seedling or plant as long as desired as long as they are properly watered. They may be stored indefinitely in the substrate outside the ground and may be transported in dry or moist condition without danger of disintegration. After transportation to the desired location, the plant may be placed in the ground with the substrate and will thus continue to grow after being thus planted.

At all times, the substrate forms a compact unit with the plant, and it is possible to dose all nutrients accurately for the growth of any particular plant or seed. The substrate unit is not only dust-free so that it may be stored cleanly but it may also be sterile, i.e. free of fungus, weed seeds and other undesirable soil components. It is light and, therefore, easy to handle, and readily produceable in any desired size. It lends itself most readily to mail orders. It enables exact control of all growth factors, including porosity and water receptivity, so that seeds may be planted in the substrate during the dead season, for instance, and stored until ready for sale and planting in the ground.

Figure 4:
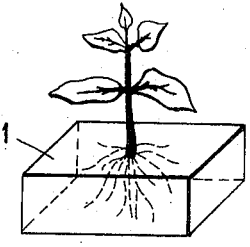
FIG. 4 is a sectional view of the three substrates of FIGS. 1 to 3 after assembly.
Figure 3:
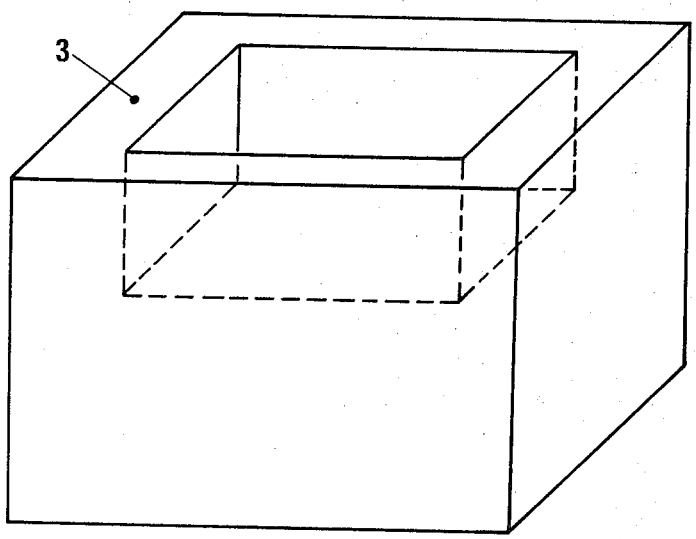
Figure 1:
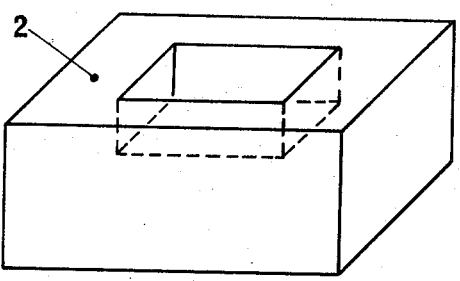

Referring now to the drawing, FIG. 1 shows a shape-retaining prismatic substrate 1 wherein a seedling is planted. Since the substrate is designed to hold the plant permanently as it continues to grow, the roots of the plant will, at a given period of growth, begin to fill the entire substrate until the root points begin to grow out of the substrate. To continue to accommodate the growing plant, a series of like substrates 2 and 3 (see FIGS. 2 and 3) of increasing volume may be provided to nourish and hold the growing roots of the plant during continued growth. Each successive substrate has a cavity snugly receiving a preceding substrate so that, when the substrates are stacked, as shown in FIG. 4, the volume of the plant sustaining material is constantly increased during the growth of the plant and the roots remain protected by the successive substrates added. In this manner, any tampering with the plant or replanting thereof during its growth from seed to fully grown plant can be fully avoided. This not only saves time and expense but also assures the undisturbed growth of the plant.

Thus, the seed may be planted in a substrate of very small dimensions, making it possible to save material and space during storage at the beginning of the growth while the growing root system can be accommodated during growth by the successive substrates without ever in any way interfering with the plant growth.

If seeds are to be nourished in substrates of this type, plate-shaped substrates are most advantageously used to provide a seed bed, the seeds being placed on the surface face of the substrate and covered by a layer of wax or a synthetic resin film, for instance. If no water is supplied and the temperature is cool, for instance during the winter, the seeds prepared in this matter will remain dormant and may be stored until subjected to elevated temperatures and moisture to start the growing process. As the seeds begin to grow and become seedlings, the plate-shaped substrate may then be cut into individual pieces with a ball around each seedling or any desired number of seedlings.

Figure 5:
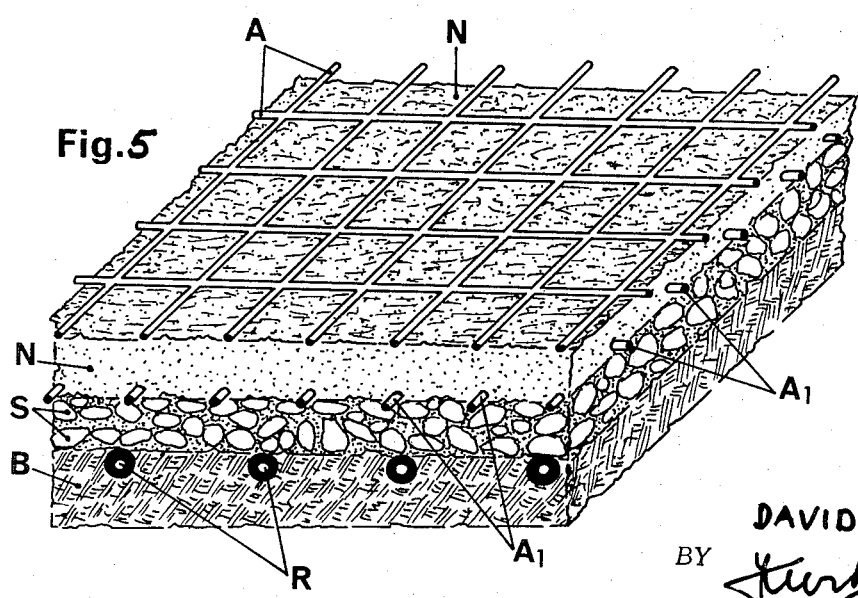
FIG. 5 shows a perspective view of a plate-shaped substrate serving as a piece of sod.

The substrate of the present invention is also useful for making pieces of sod, as will be explained hereinafter in connection with FIG. 5 showing one embodiment of sod prepared according to this invention.

Particularly where lawns are subjected to heavy wear, such as sports arenas, children's playgrounds and other heavily traveled grounds, it is useful to reinforce the substrate. As shown in the drawing the substrate N is reinforced by reinforcing nets A and $A_1$, one being placed on the surface of the substrate and the other one being embedded therein.

The net may be made of synthetic resin yarns or other textile yarns of sisal or coconut fibers, for instance, or of metallic filaments coated with a synthetic resin layer. The surface of the substrate N is seeded.

As is known, before the sod is installed on sub-soil B, perforated tubes R may be laid in the ground for underground watering of the lawn. If desired and in colder climates, steam or heated water may be supplied through the tubes R to keep the soil at an elevated temperature sufficient for keeping the sod alive. The resiliency of the lawn may be increased by placing an elastic or resilient layer S between the sub-soil and the substrate of the sod. This layer S may consist of a suitable synthetic foam or other porous material. The substrate reinforcing nets A and $A_1$ will serve not only to increase the resiliency of the lawn but they will also assist in the keeping of the sod in place, thus to improve the growth of the grass without in any way interfering with the moisture permeability of the ground and the natural growth conditions.

In all forms of the shape-retaining substrate of the present invention, the bonding agent uniformly interspersed throughout the substrate will assure its shape retention even under severe shock while at the same time providing a permanent abode for the plant which may be retained therein throughout its life without interference with the growth of the plant due to disturbance of the root system.

As will be ovious from the above, the composition of the substrate as well as the polyurethane bonding agent may be varied widely, the substrate depending primarily on the plant and the chemical composition of the polyurethane being chosen according to available raw materials, cost factors, etc.

Merely by way of example, a cubic meter of substrate for azalea plants may consist of peatmoss and 1 kg calcium carbonate and 1 kg of organic fertilizer, including bone meal and dried blood. A substrate for rose plants may consist of 60% peatmoss, 15% compost, 15% cow manure, and 10% organic fertilizer.

The above or any other suitable particulate mixture is used to make the shape-retaining substrate of the present invention.

Again merely by way of example, the polyurethane bonding agent is made of a mixture of 60% Desmophen and 30% Desmodur. Desmophens and Desmodurs are polyesters and diisocyanates, respectively, available from Bayer-Werke, Germany, and well known in the manufacture of polyurethanes. For instance, Desmophen 37/100, 38/100, and 39/100 have been successfully used in combination with Desmodur T80, which is a tolylene diisocyanate. The Desmodur/Desmophen mixture is rather viscous and, therefore, was thinned with an admixture of 10% ethyl acetate. To this liquid mixture was added 0.02% SO.

A commercially available wetting agent for peatmoss was added to the Desmophen before it was mixed with the Desmodur component in an amount to provide 0.7 to 1 part, by weight, of wetting agent in the substrate after the liquid Desmophen/Desmodur mixture has been mixed with the dry and particulate substrate components. The latter, i.e. peatmoss, foam flakes and plant nutrient were placed into a drum within the indicated weight ranges and the mixture of liquid polyurethane reactants was pumped from its container and sprayed over the substrate components in the drum until its particles were sufficiently moistened to form a doughlike mass. This mass was removed from the drum by a screw conveyor, and the mass was then pressed into the shape-retaining forms desired.

I claim:

1. A shape-retaining substrate for a plant, which comprises a mixture of 30 to 60 parts of peatmoss having a water content reduced to about 15% to less than 20%, by weight, 50 to 20 parts of synthetic resin foam flakes, a plant nutrient, and 15 to 20 parts of a polyurethane binder free of foaming agent mixed with the peatmoss, the foam flakes and the nutrient and bonding the same, all parts being by weight.

2. The shape-retaining substrate of claim 1, wherein the mixture comprises about 45 parts of peatmoss and about 45 to 40 parts of foam flakes.

3. The shape-retaining substrate of claim 1, wherein the foam flakes have a diameter of about 5 to 15 mm.

4. The shape-retaining substrate of claim 1, further comprising from about 0.7 to 1 part, be weight, of a wetting agent for the peatmoss.

5. The shape-retaining substrate of claim 1, wherein the plant is in the form of a seed on the surface of the substrate and a retaining layer is arranged over the seed on the surface of the substrate.

6. The shape-retaining substrate of claim 1, and being plate-shaped, further comprising a reinforcing net, and grass on the surface of the substrate constituting the plant.

7. A method of making a shape-retaining substrate for a plant, which comprises mixing, in the absence of a foaming agent, 15 to 20 parts of liquid reactants forming a polyurethane binder in situ with 30 to 60 parts of peatmoss having a water content reduced to about 15% to less than 20%, by weight, 50 to 20 parts of synthetic resin foam flakes, a plant nutrient, and about 0.7 to 1 part of a wetting agent for the peatmoss, all parts being by weight, and shaping the mixture to form the substrate, the polyurethane bonder formed in situ bonding the peatmoss, the foam flakes and nutrients.

* * * * *